Sept. 29, 1925.

F. POMEROY

FORK

Filed Nov. 25, 1924

1,555,605

INVENTOR.
Foster Pomeroy, Dec'd.
BY Lora Belle Clapp, Executrix
BY M. C. Frank
ATTORNEY Patented Sept. 29, 1925.

1,555,605

UNITED STATES PATENT OFFICE.

FOSTER POMEROY, DECEASED, LATE OF LOMPOC, CALIFORNIA; BY LORA BELLE CLAPP, EXECUTRIX, OF LOMPOC, CALIFORNIA.

FORK.

Application filed November 25, 1924. Serial No. 752,200.

*To all whom it may concern:*

Be it known that FOSTER POMEROY, deceased, late a citizen of the United States, residing at Lompoc, in the county of Santa Barbara and State of California, did invent certain new and useful Improvements in Forks, of which the following is a specification.

My invention relates to forks and more particularly to a fork designed for use in restaurants, hotel kitchens and the home kitchen, and consists of a device constructed with but one tine; the tine being formed at an angle and offset with relation to the shank of the fork.

In the use of the present two or more tined forks, meats or other objects forked are pinched by the engaging tines thereof, and at times much difficulty is experienced in disengaging the fork from the meat, as the latter binds or hangs to the tines. One of my prime objects is to overcome this deficiency, and I consider other outstanding features of my invention are the great advantages gained by the use of my one-tine construction, and which will be hereinafter set forth. It is obvious that upon spearing a portion of meat with my fork no binding can occur, and that the tine may be readily withdrawn after said portion is lifted, turned or taken from any surface, oven or container.

Another feature is that upon spearing a roast or other object and raising it from the pan or range, said roast or object immediately swings to its center of gravity upon the tine, thereby permitting the roast to be handled with ease and surety.

Another feature of utility is in drawing hot pans from an oven by virtue of the offset tine, said offset being used as a hook to withdraw the pan, and upon the reversal of the hook to return the said pan back into the oven.

Another feature of its unique design is its practical use for removing hot covers from various cooking utensils.

A further object of this invention is to so construct the fork that it may be adapted for many purposes in the kitchen, and which adaptations abolish the present ordinary cloth now used to prevent burning the hands.

Another object is to construct a fork of the character described, that will securely hold the object speared and allow the said object to seek its center of gravity with relation to the tine thereof and without danger of dropping off, thereby reducing effort of handling it to a minimum.

Another object is to construct a fork that will readily spear oysters, fish, fowl or tender meats and be easily withdrawn therefrom without the tendency of hanging or tearing them as the present two or more tined fork does.

One form which the invention may assume is exemplified in the following description and illustrated by way of example in the accompanying drawing, in which.

Throughout the figures the invention is shown in heavy lines compared to the lighter linework showing its adaptation to objects.

Figure 1:
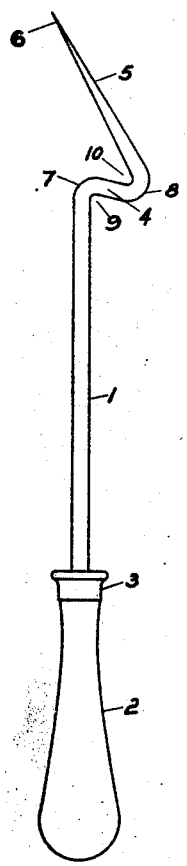
Figure 1 represent a face elevation showing the elements of my invention.
Figure 2:
Fig. 2 is an edge elevation of the tine and a portion of the shank of Fig. 1.
Figure 3:
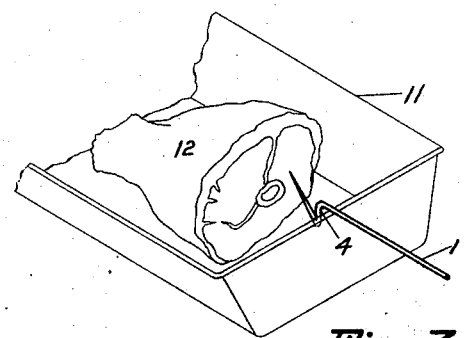
Fig. 3 is a perspective view of a roast in a pan and showing my invention as it is applied in drawing the pan from an oven for example.
Figure 4:
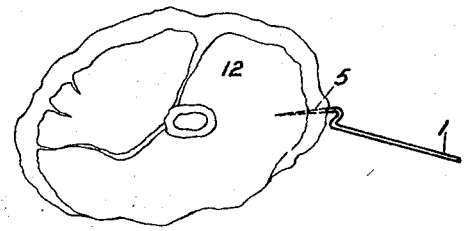
Fig. 4 is a view illustrating the method of applying the fork to the roast as in turning it over.
Figure 5:
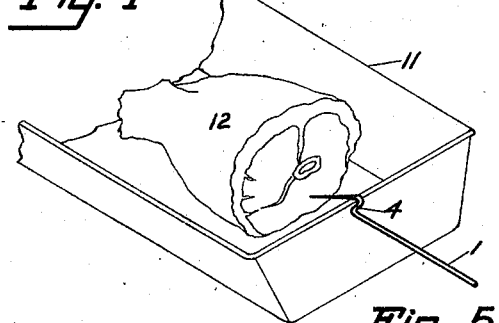
Fig. 5 is a perspective view similar to Fig. 3 and illustrates the method of using the offset portion for pushing the pan back into the oven.

Referring to the drawing and the figures thereof: the numeral 1 designates the shank of my fork and it is preferably constructed of heavy steel wire or the like, and has a handle 2 secured to one end thereof, 3 being the customary ferrule of the handle. The shank 1 extends from the handle 2 a suitable distance and near its terminal is bent outwardly from the shank to form an offset portion 4, the shank 1 and the portion 4 thus forming a V, and is then bent angularly toward and past the center line of the shank to form the tine 5, which thus together with the portion 4 forms another V. The offset portion 4 forms an acute angle with relation to the shank 1 and also to the tine 5. The bends 7 and 8 due to the offset portion 4 form oppositely disposed crotches 9 and 10 for a purpose to be presently set forth. The angular intermediate offset portion 4 forms a double hook for withdrawing the pan 11 or the like from the oven as shown in Fig. 3, and when reversed, as shown in Fig. 5, it is adapted to fit over the bead of said pan to return same to the oven by pushing.

The tine 5 of my fork is preferably tapered from the bend 8 outwardly to the point 6, forming a slender tine which may be easily inserted into an object and withdrawn therefrom. The tine and shank are also preferably formed in the same plane.

By virtue of the shape and angular position of the tine relative to the shank 1, it is obvious that when the tine is stabbed into a portion of meat 12, and the latter lifted from the range or pan, it will immediately swing to its center of gravity with respect to the tine; thereby reducing the effort of handling it to a minimum. This is a decided advantage over the present ordinary fork, as the object lifted is held rigidly in place and not allowed to swing but is held offset to the wrist which is laborious and tiresome.

It should be observed that the bend 8 is V-shaped, not U-shaped or so curved that the tine, in service, pinches upon the offset portion as in other devices, because by the V-shaped construction I avoid any binding or tightening tendency of the object held by my fork, which tendency in such devices renders them impractical to use for the purpose for which my fork is especially adapted.

Figure 6:
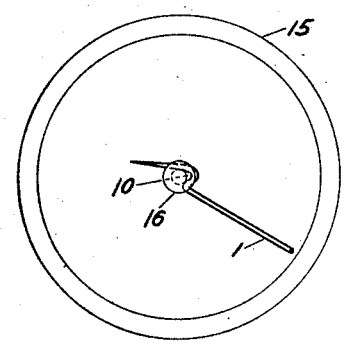
Figs. 6 and 7 illustrate methods of applying the device for the removal of covers from cooking utensils.
Figure 7:
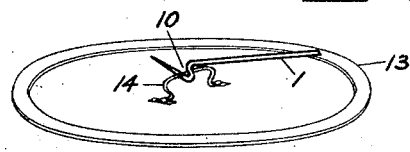

When my device is to be used for lifting a cover 13 or the like from a utensil having a looped handle 14, the tine 5 is inserted through the loop until the handle is engaged in the crotch 10 as shown in Fig. 7; and Fig. 6 shows the device in place to lift a cover 15 having a handle 16 in the form of a knob, and under which knob the crotch 10 is adapted to seat for the removal of the cover.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

1. A fork comprising a relatively long body portion, a handle on one end of said body portion and an offset near the other end, the said offset forming a hook and having a tine extending angularly therefrom and passing through the extension of the axis of the body portion, the tine together with the offset forming a V.

2. A kitchen fork consisting of a relatively long straight rod having an offset formed near an end thereof and a straight tine extending from the offset and crossing the axis of the rod, the tine together with the offset forming a V.

3. A fork consisting of a straight body and a single straight tine formed thereto by an intermediate straight offset, the offset forming with the said body and tine two V's adapted for service purposes.

4. A fork comprising a relatively long straight rod terminating in a tine formed angularly thereto by an offset portion, the tine and offset being in the plane of the rod and the tine forming a V with the offset portion and extending through the axis of the rod.

FOSTER POMEROY, Dec'd,
By LORA BELLE CLAPP,
 Executrix of Will and Testament
 of Foster Pomeroy, Dec'd.